United States Patent
Chessell et al.

(10) Patent No.: US 9,703,666 B2
(45) Date of Patent: Jul. 11, 2017

(54) METHOD, APPARATUS AND SOFTWARE FOR MANAGING THE GENERATION OF PROCESS EVENTS BY A SOFTWARE PROCESS

(75) Inventors: Amanda Elizabeth Chessell, Hants (GB); Graham Castree Charters, Hampshire (GB); Pete Stretton, Hampshire (GB)

(73) Assignee: International Business Machines Corporation, Armonk, NY (US)

(*) Notice: Subject to any disclaimer, the term of this patent is extended or adjusted under 35 U.S.C. 154(b) by 1709 days.

(21) Appl. No.: 12/030,143

(22) Filed: Feb. 12, 2008

(65) Prior Publication Data
US 2008/0208657 A1 Aug. 28, 2008

(30) Foreign Application Priority Data
Feb. 28, 2007 (EP) .................................. 07103209

(51) Int. Cl.
G06F 11/34 (2006.01)
G06Q 10/06 (2012.01)

(52) U.S. Cl.
CPC .......... G06F 11/3447 (2013.01); G06F 11/34 (2013.01); G06Q 10/063 (2013.01); G06Q 10/0639 (2013.01); G06Q 10/06393 (2013.01); G06F 2201/86 (2013.01)

(58) Field of Classification Search
CPC .. G06F 11/30–11/3495; G06F 2201/86; G06F 2201/865–2201/88; G06Q 10/063; G06Q 10/0639; G06Q 10/06393
See application file for complete search history.

(56) References Cited

U.S. PATENT DOCUMENTS

| | | | |
|---|---|---|---|
| 6,467,052 B1* | 10/2002 | Kaler et al. | 714/39 |
| 6,490,574 B1* | 12/2002 | Bennett et al. | 706/47 |
| 6,697,791 B2 | 2/2004 | Hellerstein et al. | |
| 6,829,632 B1* | 12/2004 | Chessell et al. | 709/203 |
| 6,948,175 B1* | 9/2005 | Fong et al. | 719/331 |
| 7,103,874 B2 | 9/2006 | McCollum et al. | |
| 7,155,641 B2* | 12/2006 | Prang et al. | 714/47.1 |
| 7,313,447 B2* | 12/2007 | Hsiung et al. | 700/9 |
| 7,321,992 B1* | 1/2008 | Vellore et al. | 714/47.1 |
| 7,496,799 B2* | 2/2009 | Prang et al. | 714/47.1 |

(Continued)

FOREIGN PATENT DOCUMENTS

EP 1674988 A2 * 6/2006

OTHER PUBLICATIONS

Fu, S., et al., "An Intelligent Event Adaptaion Mechanism for Business Performance Monitoring", Proceedings of the IEEE Internation Conference on e-Business Engineering [online], 2005, [retrieved Feb. 14, 2012], Retrieved from Internet: <http://ieeexplore.ieee.org/stamp/stamp.jsp?tp=&arnumber=1552947>, pp. 1-6.*

(Continued)

Primary Examiner — Todd Aguilera
(74) Attorney, Agent, or Firm — Steven M. Greenberg, Esq.; CRGO Law

(57) ABSTRACT

A method, apparatus and software is disclosed for managing the generation of process events generated by a software process for supply to a process monitoring system, in which the generation of process events can be enabled or disabled on a group basis.

19 Claims, 5 Drawing Sheets

(56) References Cited

U.S. PATENT DOCUMENTS

| | | | |
|---|---|---|---|
| 7,818,754 B2 * | 10/2010 | Morris et al. | 719/318 |
| 7,904,889 B2 * | 3/2011 | Avitzur et al. | 717/128 |
| 7,941,454 B2 * | 5/2011 | Chessell | 707/802 |
| 8,886,549 B2 * | 11/2014 | Herwadkar | G06Q 10/06 705/500 |
| 2002/0073195 A1 | 6/2002 | Hellerstein et al. | |
| 2004/0083013 A1 | 4/2004 | Tolley | |
| 2005/0091640 A1 | 4/2005 | McCollum et al. | |
| 2005/0125809 A1 * | 6/2005 | Chessell | 719/318 |
| 2006/0004597 A1 * | 1/2006 | Charters et al. | 705/1 |
| 2006/0106626 A1 * | 5/2006 | Jeng et al. | 705/1 |
| 2006/0150155 A1 * | 7/2006 | Blight et al. | 717/124 |
| 2006/0259163 A1 * | 11/2006 | Hsiung et al. | 700/30 |

OTHER PUBLICATIONS

Sachdeva, N., et al., "On Demand Business Process Life Cycle, Part 8: Business Process Monitoring—Creating Key Performance Indicators," IBM DeveloperWorks [online], 2005 [retrieved Jul. 21, 2012], Retrieved from Internet: <http://www.ibm.com/developerworks/webservices/library/ws-odbp8/>, pp. 1-16.*

Stuart, I., et al., Oracle® BPEL Process Analytics User's Guide, Oracle [online], 2005 [retrieved Mar. 30, 2016], Retrieved from Internet: <URL: https://docs.oracle.com/cd/B14099_19/integrate.1012/b15597.pdf>, pp. i-xi, 1-1-1-14, 6-1-6-19, 9-1-9-18.*

Stuart, I., et al., Oracle® BPEL Process Analytics User's Guide, Oracle [online], 2005 [retrieved Oct. 15, 2016], Retrieved from Internet: <URL: https://docs.oracle.com/cd/B14099_19/integrate.1012/b15597.pdf>, pp. 2-1-2-40.*

* cited by examiner

METHOD, APPARATUS AND SOFTWARE FOR MANAGING THE GENERATION OF PROCESS EVENTS BY A SOFTWARE PROCESS

FIELD OF INVENTION

The present invention relates to a method, apparatus or software for managing the generation of process events by a software process.

BACKGROUND OF THE INVENTION

Software or IT systems are commonly used to perform complex processes such as business processes. Such software systems are often coupled with process monitoring systems arranged to monitor process events within the processing performed by the software system. The process events may be used to calculate a set of performance measures in the form of Key Performance Indicators (KPIs). The KPIs are then presented to the administrators or managers of the software system via monitor interfaces provided by the monitoring system. The set of KPIs for a process, such as a business process, may be used to provide an indication of the performance of the business process against predetermined performance targets. Such monitoring systems can be referred to as Business Activity Monitoring (BAM) systems.

In many such process monitoring systems, the software system being monitored is often able to generate many more process events than are required by the process event monitoring infrastructure for monitoring the performance of the system. Therefore, system administrators typically configure the process monitoring system so as to limit the generated process events to those required by the current set of monitor interfaces. As individual monitors for given KPIs are added, modified or removed from the monitoring system, the set of required process events is also changed and may become out of step with the set of process events actually generated by the software system being monitored. Often, more process events are generated than are actually used by the monitoring system. Generating process events is expensive, in performance terms, for the software system. Therefore, in order to maintain the efficiency of the software system, the set of generated process events requires complex and expensive maintenance.

SUMMARY OF THE INVENTION

An embodiment of the invention provides a method for managing the generation of process events by a software process for supply to a process monitoring system, the method comprising the steps of:

a) identifying a set of process events for monitoring by a process monitoring system the process events being generatable by a software process;

b) determining one or more sub-sets of the set of process events;

c) selecting one or more of the identified sub-sets;

d) enabling the generation of the or each selected sub-set of process events by the software process; and e) providing the generated selected sub-set of process events to the process monitoring system for monitoring.

The generation of one or more of the selected sub-sets by the software system may be disabled. Disablement of one or more of the sub-sets may be blocked. If any one or more of the sub-sets remains unused by the process monitoring systems for a predetermined period, the generation of the or each unused sub-set may be disabled. The generation of any event not identified in a sub-group may be disabled. One or more of the determined sub-groups may be correlated to a performance indicator for the software process. One or more of the subsets may be associated with a monitoring process. The process events comprising one or more of the sub-sets may be determined from those process events in use by the process monitoring system. The process events comprising one or more of the sub-sets may be determined from the process events configured for monitoring by the process monitoring system.

A set of process event pattern rules may be applied to the set of process events so as to identify one or more patterns of process events in the set. One or more of the sub-sets may be determined automatically from the identified patterns of process events in accordance with a set of sub-set selection rules. One or more of the sub-sets may be automatically correlated with a performance indicator for the software system in accordance with a set of correlation rules. The software process may be a business process and the process events mat be business process events.

Another embodiment provides apparatus for managing the generation of process events by a software process for supply to a process monitoring system, the apparatus being operable to:

identify a set of process events for monitoring by a process monitoring system the process events being generatable by a software process;

determine one or more sub-sets of the set of process events;

select one or more of the identified sub-sets;

enable the generation of the or each selected sub-set of process events by the software process; and provide the generated selected sub-set of process events to the process monitoring system for monitoring.

A further embodiment provides a program or a set of programs arranged to enable a programmable device or groups of such devices to perform a method for managing the generation of process events by a software process for supply to a process monitoring system, the method comprising the steps of:

a) identifying a set of process events for monitoring by a process monitoring system the process events being generatable by a software process;

b) determining one or more sub-sets of the set of process events;

c) selecting one or more of the identified sub-sets;

d) enabling the generation of the or each selected sub-set of process events by the software process; and e) providing the generated selected sub-set of process events to the process monitoring system for monitoring.

Another embodiment provides a program or a set of programs arranged to enable a programmable device or groups of such devices to provide apparatus for managing the generation of process events by a software process for supply to a process monitoring system, the apparatus being operable to:

identify a set of process events for monitoring by a process monitoring system the process events being generatable by a software process;

determine one or more sub-sets of the set of process events; select one or more of the identified sub-sets;

enable the generation of the or each selected sub-set of process events by the software process; and provide the generated selected sub-set of process events to the process monitoring system for monitoring.

BRIEF DESCRIPTION OF THE DRAWINGS

Embodiments of the invention will now be described, by way of example only, with reference to the accompanying drawings in which.

DETAILED DESCRIPTION OF PREFERRED EMBODIMENTS OF THE INVENTION

Figure 1:
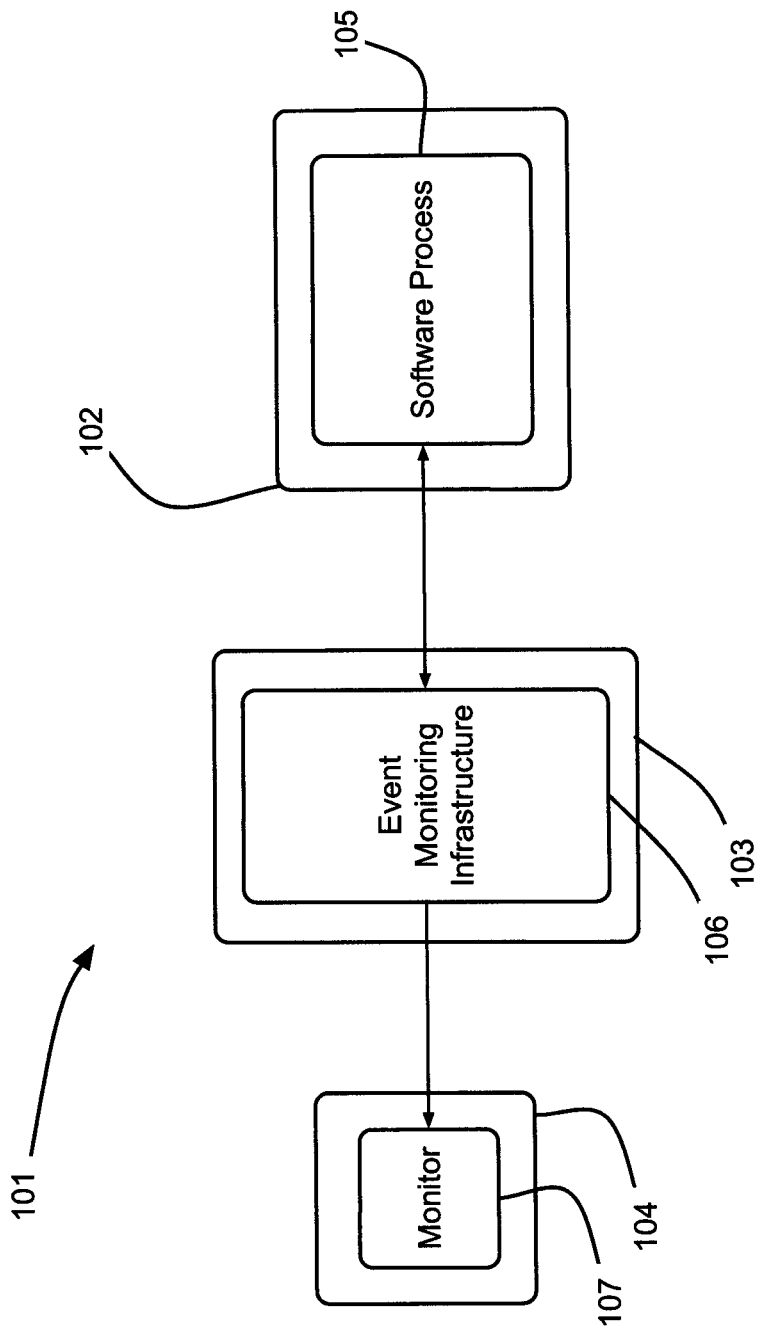
FIG. 1 is a schematic illustration of a computer system for managing the generation of process events generated by a software process.

With reference to FIG. 1, a computer system 101 comprises a first server computer 102 connected to a second server computer 103, which is connected in turn to a client computer 104. The first server computer 102 is running an application program providing a software process 105 in the form of computerised sales system. The second server computer 103 is running an application program in the form of a process event monitoring system 106 arranged to handle process events generated by the software process 105 running on the first server computer 102. The client computer 104 is running an application program providing a monitor interface 107 that enables a user to monitor the performance of the software process 105 using Key Performance Indicators (KPIs) derived from groups of process events provided by the process event monitoring system 106. Together, the process event monitoring system 106 and the monitor interface 107 provide a Business Activity Monitoring (BAM) system.

Figure 2:
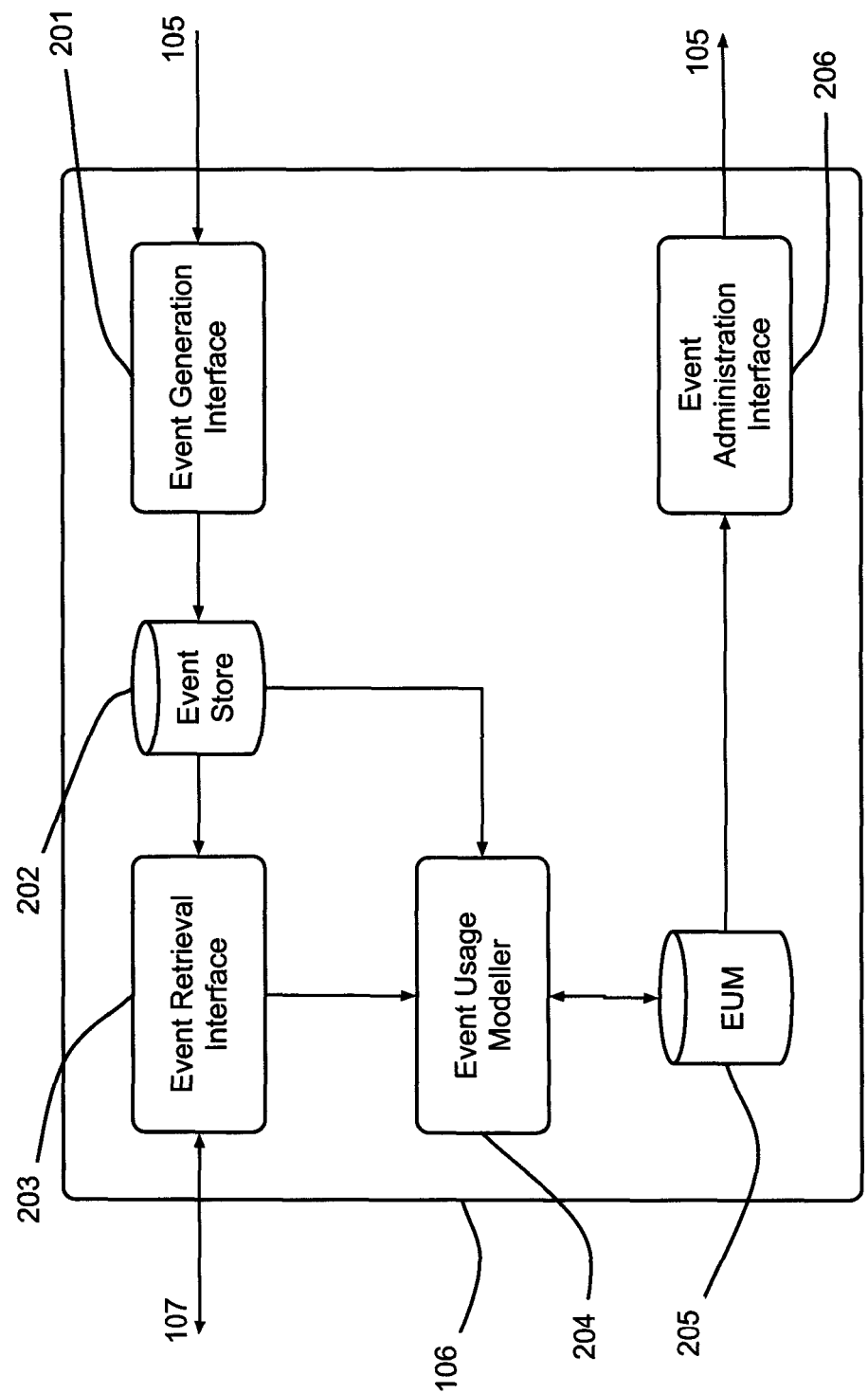
FIG. 2 is a schematic illustration of event monitoring infrastructure in the computer system of FIG. 1.

With reference to FIG. 2, the process event monitoring system 106 comprises an event generation interface 201 arranged to collect process events from the software process 105 running on the first server 102. The process events collected by the generation interface 201 are stored in an event store 202. An event retrieval interface 203 is connected between the event store 202 and the monitor interface running on the client computer 104. The event retrieval interface 203 provides the access point for the monitor interface 107 to the process events stored in the event store 202. The monitor interface 107 is arranged to access the process events by either making requests or queries to, or by registering one or more subscriptions with, the event retrieval interface 203. In response to such queries or subscriptions, the event retrieval interface 203 is arranged to retrieve the requested or subscribed process events from the event store 203, if and when they are available therein.

In the present embodiment, the process event monitoring system 103 further comprises an event usage modeller 204 arranged to identify the queries or subscriptions performed by the monitor interface 107 at the event retrieval interface 203. Using the queries or subscriptions, the event usage modeller enables the building of a model of the monitor interface 107 in terms of the process events that it utilises. The model, in the form of an event usage model (EUM) is stored in an EUM store 205. The EUM comprises selected groups or sub-sets from the set of all process events in the event store 202. The sub-sets are selected based on the process events actually used by the monitor interface 107. Furthermore, each such sub-set of process events is correlated with a given key performance indicator (KPI) provided to a user by the monitor interface 107. Once an EUM model has been created, it is used, by an event administration interface 206 to manage the generation of process events from the software process 105. The event administration interface 206 operable to enable or disable the generation of individual process events by the software process 105.

Figure 3A:
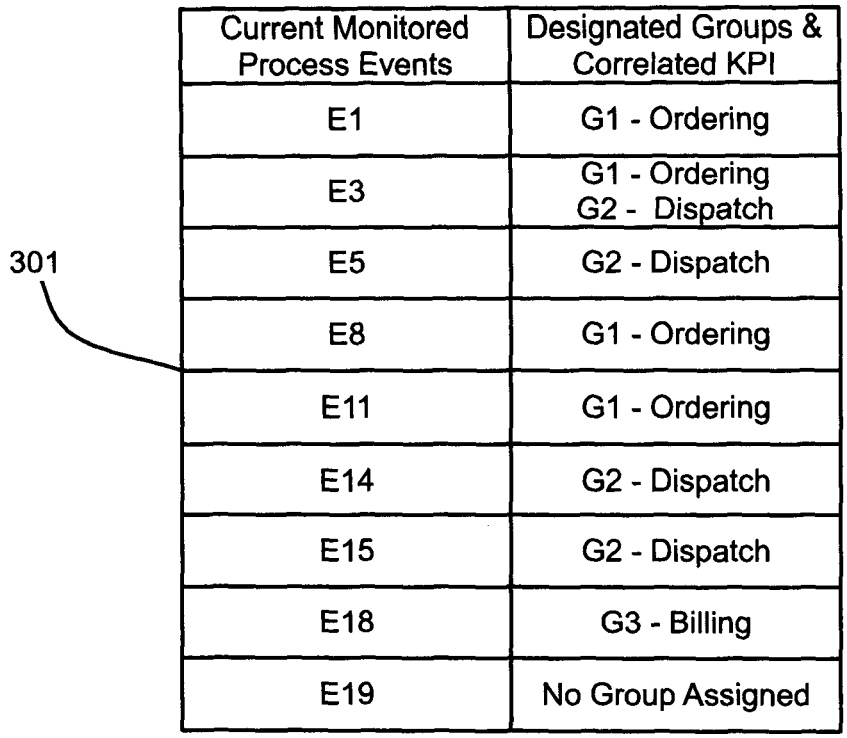
FIGS. 3a, 3b and 4 are tables illustrating data used by the event monitoring infrastructure of FIG. 2.
Figure 3B:
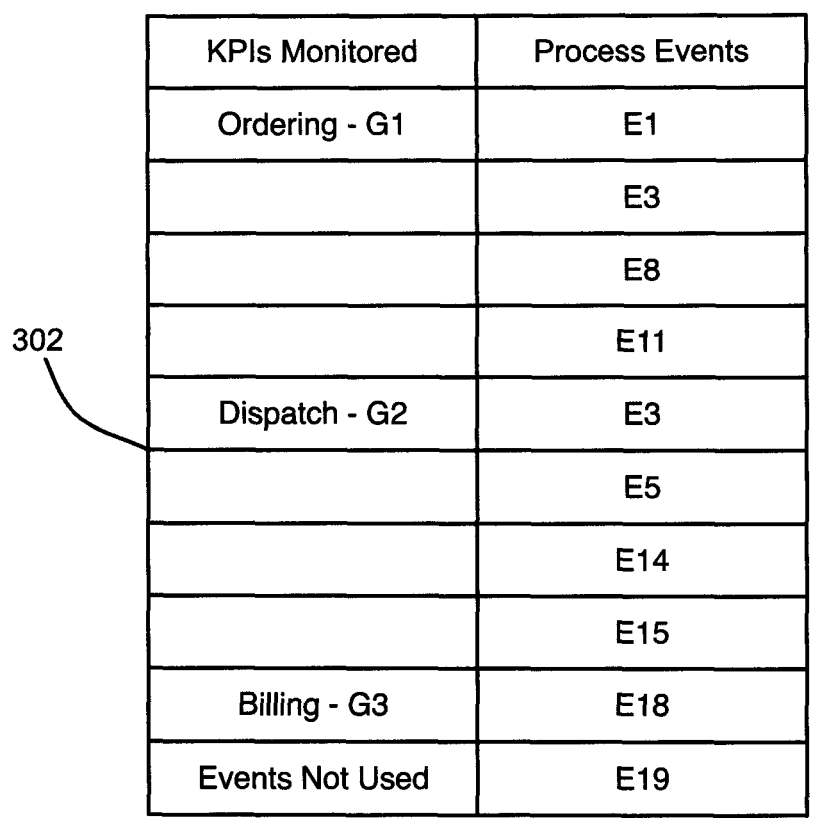

FIG. 3a shows a table 301 illustrating an example of process event data extracted by the event usage modeller 204 from the event retrieval interface. The first column lists the identifiers for each of the process events for which the event retrieval interface holds a subscription or has been queried for. The second column shows the group identifier (G1, G2, G3) designated to each process event as well as the name of the KPI correlated with each designated group. Where a process event does not contribute to any KPI, no group is assigned as shown in the last line of the table. In the present embodiment, the designation of groups and the correlation with KPIs is performed by a system administrator. Organising the process events into groups correlated with KPIs enables the event usage modeller 204 to create an EUM for the monitor interface 107, as shown in the table 302 of FIG. 3b. The first column lists the current set of KPIs being monitored via the monitor interface 107. The second column lists the corresponding process events for each monitored KPI. The EUM 302 initially also comprises a list of the unused process events as shown in the last line of the table of FIG. 3b.

Figure 4:
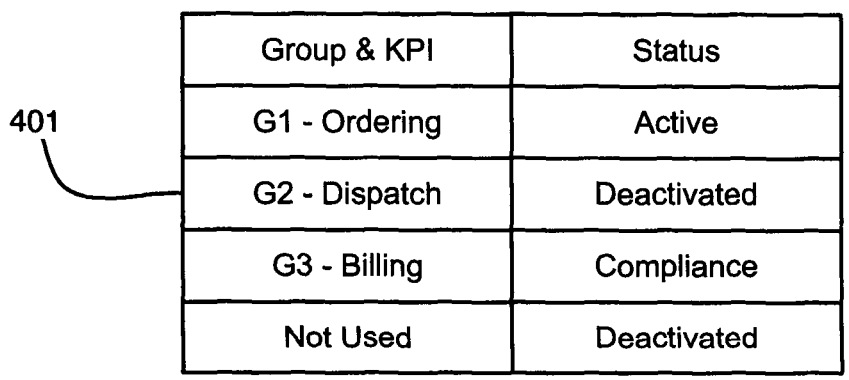

The event administration interface 206 is arranged to use the EUM 302 for managing the process events generated. For example, groups of process events that are no longer required may be disabled as a group so those process events are no longer produced by the software process 105. Conversely, groups of processes that are currently inactive or disabled may be made active or enabled as a group. Some groups may be designated as mandatory in that they may provide data that is essential for the software process to comply with certain rules. FIG. 4 shows a status table 401 for the groups contained in EUM of FIG. 3b. The status table 401 shows that the group G1 is active, while the group G2 has been deactivated. Furthermore, the group G3 is designated as a compliance group and thus its deactivation is blocked. Group G3 relates to billing, which, for the sales system of the present embodiment, is designated as compulsory for the software system 105 to comply with the rules under which it is operated. As shown in the last line of the status table 401, any process events, such as E19, that are not designated as part if a group are deemed as unused and are automatically deactivated. If any process event, such as E3, forms part of more than one group, then as long as that process event forms part of active group, the event administration interface is arranged to ensure that the generation of process event is not deactivated.

In the present embodiment, groups of process events may be activated or deactivated manually. Furthermore, the event usage modeller is arranged to periodically update its current model against the set of events currently in use by the monitor interface via the event retrieval interface 203. This automatic activation or deactivation of groups of process events is coupled to corresponding activity of the monitor interface 107 which comprises one or more individual monitors, each assigned to monitor a given KPI. If an individual monitor is deactivated at the monitor interface 104, the event monitoring system 103 is arranged to detect this deactivation and to automatically deactivate, as a whole, the generation of the group of process events correlated with that KPI. Conversely, if a given individual monitor associated with a KPI is activated, the group of process events correlated with the KPI is automatically activated as a whole. If, for example, the monitor interface is no longer monitoring the Dispatch KPI then the group G2 of process events will be automatically disabled. Similarly, if the monitoring of the Dispatch KPI is then resumed, the group G2 is automatically reactivated.

Figure 5:
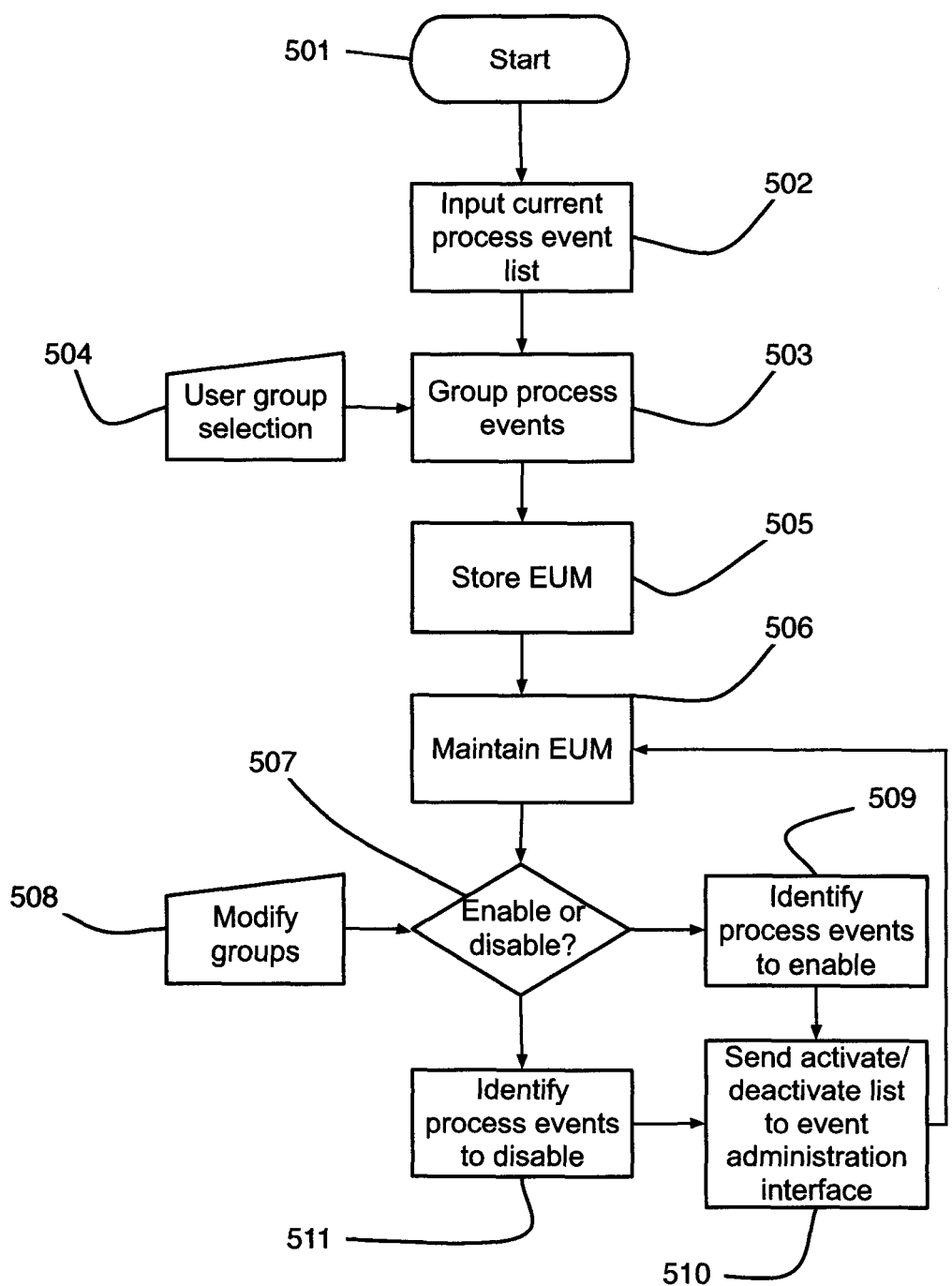
FIG. 5 is a flow chart illustrating processing performed by the event monitoring infrastructure of FIG. 2.

The processing carried out by the event monitoring system 106 in managing the generation of process events for the software system 105 will now be described further with reference to the flow chart of FIG. 5. At step 501, the event monitoring system 106 started up and processing moves to step 502. At step 502, the list of current process events is extracted from the active subscriptions or queries held by the event retrieval interface 203. Processing then moves to step 503 where the current process events are grouped in accordance with the groupings selected by a user at step 504. Processing then moves to step 505 where the resulting EUM is stored in the EUM store 205. Processing then moves to step 506 where the EUM is maintained by deactivating the generation of any process events not assigned to any group or to an inactive monitoring process, and activating the generation of all events associated with one or more active monitoring processes. Any process event in an inactive group is not deactivated if it is also in any active group. Processing then moves to step 507 to await any user input 508 to modify the groups assigned in the EUM by disabling or enabling, as a whole, the generation of the process events in one or more such groups. If the input 508 is an instruction to enable a selected group then processing moves to step 509 where the process events in the group are identified and processing moves to step 510. At step 510, the list of process events for activation is sent to the event administration interface 206. If at step 507, the input 508 is an instruction to disable a selected group then processing moves to step 511 where the process events in the selected group but not in any active other group are identified. Processing then moves to step 510 where the list of process events for deactivation is sent to the event administration interface 206. Processing then return to step 506 and proceeds as described above.

In another embodiment, after the initial grouping performed by a system administrator, the grouping of new process events is performed automatically by a rule based event listener. When a system administrator selects the initial groups of process events, meta data is also created and associated with each process event. A rule derivation system is then applied to the grouped process events and arranged to derive rules, based on the meta data, for grouping new process events. For example, if all known process events having the meta data characteristic "financial transaction" are assigned to a group named "Financial Compliance" group, then a rule can be derived to assign all new process events having corresponding meta data to that same group.

In another embodiment, the event monitoring system 103 is equipped with a set of group derivation patterns and a set of rules for applying the derivation patterns to the current set of process events. The patterns and rules are arranged to identify patterns within the current set of process events and to thus automatically group process events.

It will be understood by those skilled in the art that the apparatus that embodies a part or all of the present invention may be a general purpose device having software arranged to provide a part or all of an embodiment of the invention. The device could be single device or a group of devices and the software could be a single program or a set of programs. Furthermore, any or all of the software used to implement the invention can be communicated via any suitable transmission or storage means so that the software can be loaded onto one or more devices.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

The invention claimed is:

1. A method for managing a generation of process events by a software process for supply to a process monitoring system comprising a client computer and a server computer, said method comprising the steps of:

collecting, by a processor of the server computer, process events generated by the software process;

storing, by the processor of the server computer, the collected process events in an event store;

retrieving from the event store, by the processor of the server computer, requested process events that are used by the client computer of the process monitoring system;

building, by the processor of the server computer, an event usage model based on the requested process events by organizing the requested process events into sub-sets corresponding to key performance indicators (KPIs) monitored by the client computer;

assigning ones of the requested process events that contribute to a corresponding one of the KPIs into a group associated with a corresponding one of the KPIs to which each of the ones of the requested process events contribute;

storing the event usage model as a table, a second column of the table comprising identifiers of the requested process events, a first column of the table comprising a plurality of group identifiers, each group identifier associated with a name of a KPI, the table additionally including a list of requested process events that do not contribute to any KPIs, wherein the list is not associated with a group; and managing, by the processor of the server computer, the generation of process events from the software process using the event usage model in the table by deactivating, generation of any of the requested process events not assigned to any group in the table or to an inactive monitoring process, and activating generation of all events in the table associated with one or more active monitoring processes.

2. The method according to claim 1, wherein the managing step includes enabling or disabling the generation of individual process events by the software process.

3. The method according to claim 2, wherein when any one or more of said sub-sets remains unused by said process monitoring system for a predetermined period, the generation of the or each unused sub-set is disabled.

4. The method according to 3, wherein disablement of the any one or more of said sub-sets that are designated as compulsory is blocked.

5. The method according to claim 2, wherein the generation of any process event not identified in a sub-set is disabled.

6. The method according to claim 1, wherein a set of process event pattern rules are applied to said process events so as to identify one or more patterns of process events.

7. The method according to claim 6, wherein one or more sub-sets is determined automatically from said identified patterns of process events in accordance with a set of sub-set selection rules.

8. The method according to claim 7, wherein one or more of said sub-sets is automatically correlated with a performance indicator for said software process in accordance with a set of correlation rules.

9. The method according to claim 1 in which said software process is a business process and said process events are business process events.

10. An apparatus for managing the generation of process events by a software process for supply to a process monitoring system, said apparatus comprising a hardware processor being operable to:
collect process events generated by the software process;
store the collected process events in an event store;
retrieve from the event store, requested process events that are used by the client computer of the process monitoring system;
build an event usage model based on the requested process events by organizing the requested process events into sub-sets corresponding to key performance indicators (KPIs) monitored by the client computer;
assign ones of the requested process events that contribute to a corresponding one of the KPIs into a group associated with a corresponding one of the KPIs to which each of the ones of the requested process events contribute;
store the event usage model as a table, a second column of the table comprising identifiers of the requested process events, a first column of the table comprising a plurality of group identifiers, each group identifier associated with a name of a KPI, the table additionally including a list of requested process events that do not contribute to any of the KPIs, wherein the list is not associated with a group; and
manage the generation of process events from the software process using the event usage model by deactivating generation of any of the requested process events not assigned to any group or to an inactive monitoring process, and activating generation of all events associated with one or more active monitoring processes.

11. The apparatus according to claim 10, wherein the managing step includes enabling or disabling the generation of individual process events by the software process.

12. The apparatus according to claim 11, wherein when any one or more of said sub-sets remains unused by said process monitoring system for a predetermined period, the generation of the or each unused sub-set is disabled.

13. The apparatus according to claim 12, wherein disablement of the any one or more said sub-sets that are designated as compulsory is blocked.

14. The apparatus according to claim 11, wherein the generation of any process event not identified in a sub-set is disabled.

15. The apparatus according to claim 10, wherein a set of process event pattern rules are applied to said process events so as to identify one or more patterns of process events.

16. The apparatus according to claim 15, wherein one or more sub-sets is determined automatically from said identified patterns of process events in accordance with a set of sub-set selection rules.

17. The apparatus according to claim 16, wherein one or more of said sub-sets is automatically correlated with a performance indicator for said software process in accordance with a set of correlation rules.

18. The apparatus according to claim 10 in which said software process is a business process and said process events are business process events.

19. A non-transitory storage means having, program code stored therein that when executed enables a programmable device to:
collect process events generated by a software process;
store the collected process events in an event store;
retrieve from the event store, requested process events that are used by the client computer of the process monitoring system;
build an event usage model based on the requested process events by organizing the requested process events into sub-sets corresponding to key performance, indicators (KPIs) monitored by the client computer;
assign ones of the requested process events that contribute to a corresponding one of the KPIs into a group associated with a corresponding one of the KPIs to which each of the ones of the requested process events contribute;
store the event usage model as a table, a second column of the table comprising identifiers of the requested process events, a first column of the table comprising a plurality of group identifiers, each group identifier associated with a name of a KPI, the table additionally including a list of requested process events that do not contribute to any of the KPIs, wherein the list is not associated with a group; and
manage the generation of process events from the software process using the event usage model by deactivating generation of any of the requested process events not assigned to any group or to an inactive monitoring process, and activating generation of all events associated with one or more active monitoring processes.

* * * * *